(12) United States Patent
Magnussen

(10) Patent No.: US 6,522,415 B1
(45) Date of Patent: Feb. 18, 2003

(54) DEVICE AND METHOD FOR DETERMINING A RELATIVE POSITION OF TWO OBJECTS WITH REGARD TO ONE ANOTHER

(75) Inventor: Björn Magnussen, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/743,250

(22) PCT Filed: Jul. 1, 1999

(86) PCT No.: PCT/DE99/01933

§ 371 (c)(1),
(2), (4) Date: Jan. 5, 2001

(87) PCT Pub. No.: WO00/03204

PCT Pub. Date: Jan. 20, 2000

(30) Foreign Application Priority Data

Jul. 9, 1998 (DE) .......................................... 198 30 831

(51) Int. Cl.⁷ ................................................ G01B 11/24
(52) U.S. Cl. ............................ 356/614; 73/559; 73/610
(58) Field of Search .................. 356/614, 622; 73/599, 609, 610, 620, 514.21, 514.36, 862.046; 364/550, 449

(56) References Cited

U.S. PATENT DOCUMENTS

| | | | |
|---|---|---|---|
| 4,475,814 A | | 10/1984 | Marche |
| 5,068,795 A | * | 11/1991 | Kamimura et al. ......... 364/449 |
| 5,126,946 A | | 6/1992 | Ko |
| 5,269,188 A | * | 12/1993 | Esin et al. .................... 73/610 |
| 5,274,573 A | * | 12/1993 | Buisker et al. ............. 364/550 |
| 5,565,627 A | * | 10/1996 | Dorr ............................ 73/599 |
| 5,869,764 A | * | 2/1999 | Schulte ........................ 73/620 |
| 6,067,862 A | * | 5/2000 | Murray et al. ................ 73/862 |
| 6,134,964 A | * | 10/2000 | Jaenker et al. ............ 73/514.21 |

FOREIGN PATENT DOCUMENTS

| | | |
|---|---|---|
| DE | 30 12 811 | 1/1981 |
| DE | 43 02 434 | 8/1994 |
| EP | 0 441 060 | 8/1991 |
| JP | 03 130 681 | * 6/1991 |

OTHER PUBLICATIONS

B. Magnussen, "Infrastruktur für Steuerungs—und Regelungs—Systeme von robotischen Miniatur–und Mikrogreifern" Forschrittsberiche VDI Verlag GmbH, No. 567, (1996), pp. 68–78.

R. Bauer, "Integriertes hierarchisches Navigationssystem für autonome mobile Roboter", Dissertation, (1996), pp. 17–23 and 35–41.

* cited by examiner

*Primary Examiner*—Frank G. Font
*Assistant Examiner*—Sang H. Nguyen
(74) *Attorney, Agent, or Firm*—Staas & Halsey LLP

(57) ABSTRACT

Arrangements and methods for determining a relative position of two objects with respect to one another are presented wherein a radiation source generates a characteristic radiation field and a receiver measures radiation quantities of the radiation. The receiver transmits signals that are dependent on the measured radiation quantities in the characteristic radiation field to the evaluation unit, which determines the relative position of the objects with respect to one another dependent on the signals received from the receiver. Due to a connection of the two objects of the arrangement with an elastic connection having a predetermined stiffness, the evaluation unit determines the force acting between the objects and/or the moment acting between the objects from a relative positional change of the two objects with respect to one another dependent on the stiffness of the connections.

29 Claims, 7 Drawing Sheets

Figure 1:
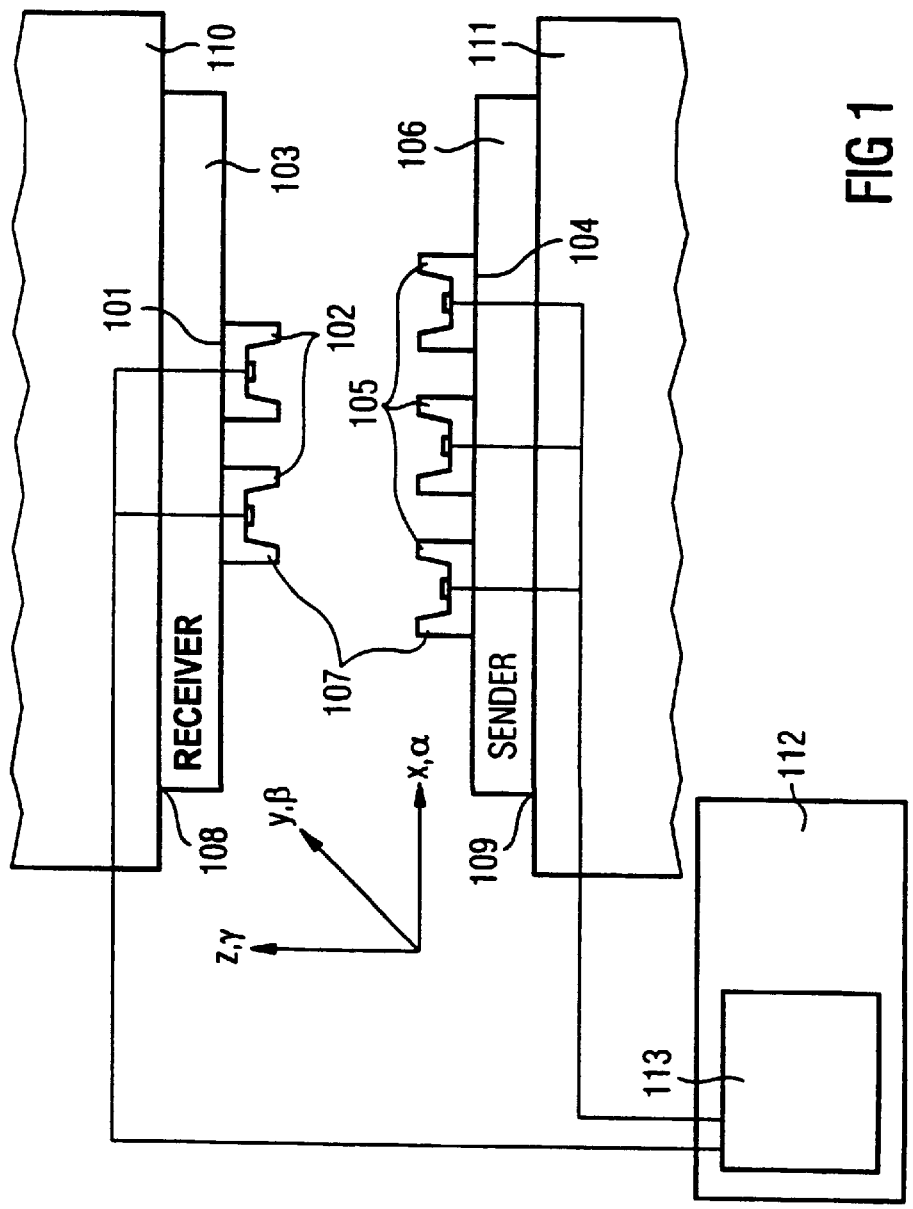

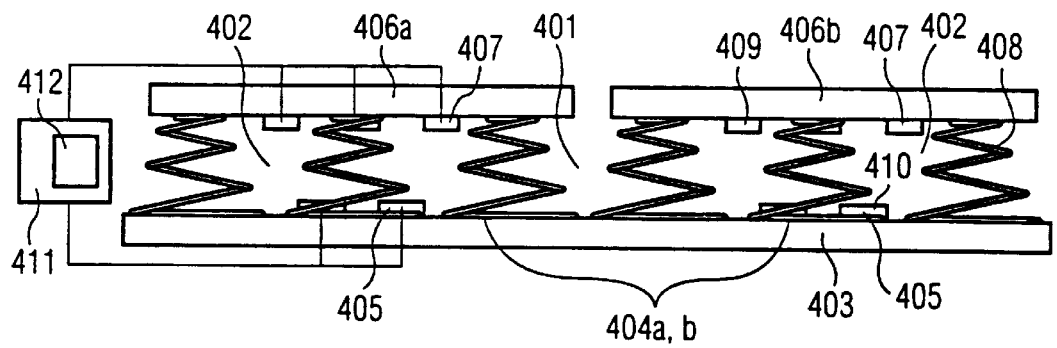
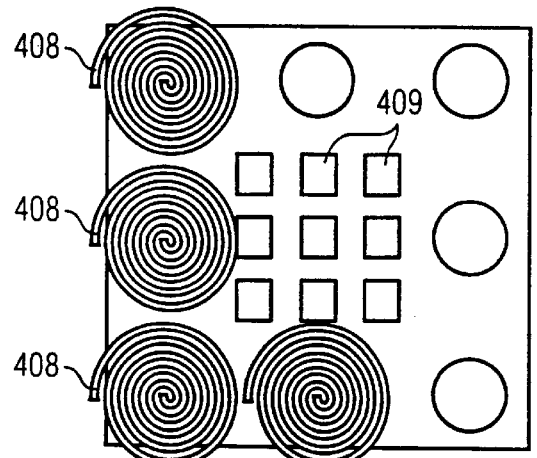
FIG 4
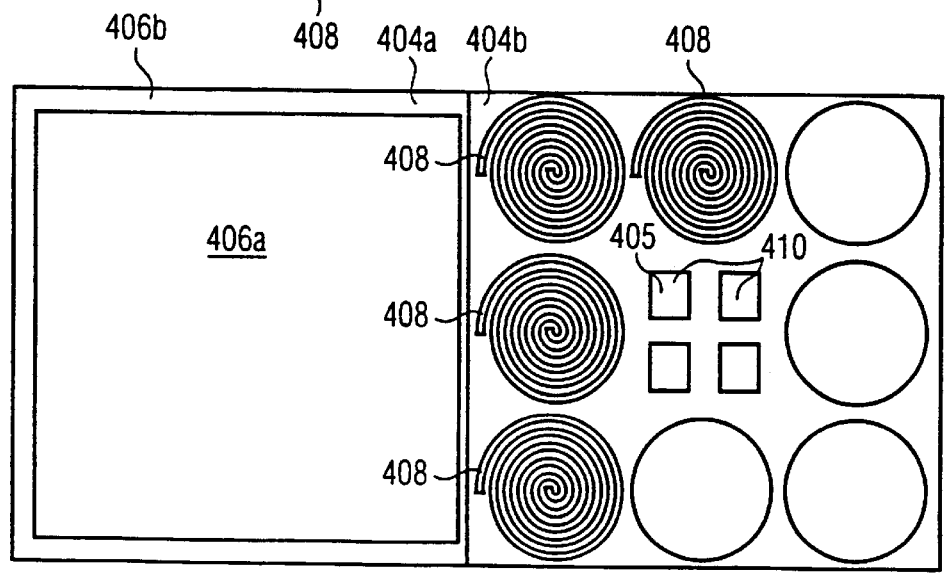

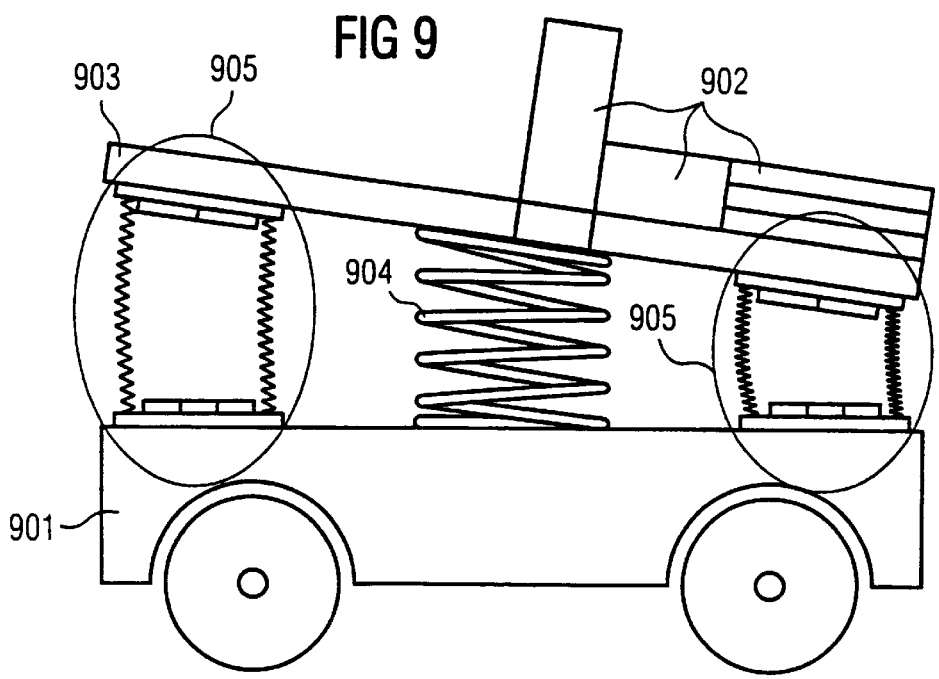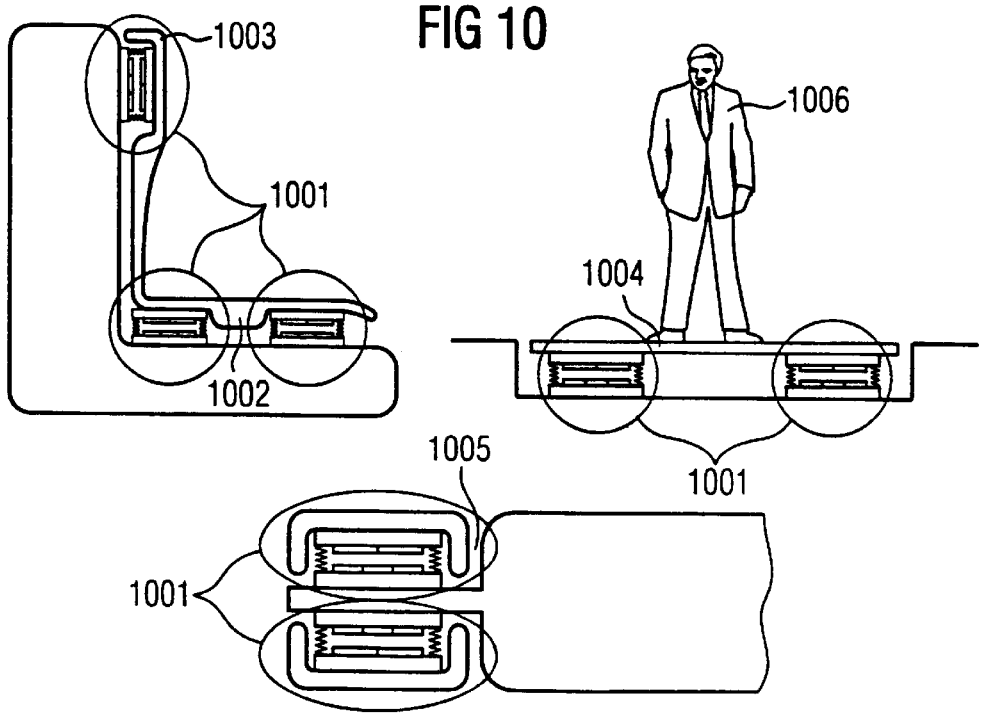

DEVICE AND METHOD FOR DETERMINING A RELATIVE POSITION OF TWO OBJECTS WITH REGARD TO ONE ANOTHER

The invention is directed to the determination of a relative position of two objects with respect to one another.

A robot is being increasingly employed for assembly work due to electronic and electro-technical progress. This robot is equipped with a flexible gripper system that is in the position of implementing the greatest variety of handling and manipulation tasks.

Document [1] provides an overview of technical systems that are utilized for grasping and manipulating an object. Further, [1] discloses that the grasped object must be in a permanently prescribed position relative to the gripper system, namely such that a prescribable force can be exerted on the object.

It is known from [1] that manipulation means that the position of the grasped object and, potentially, its orientation in space is modified in a predetermined way.

In conjunction with a gripper system, it thereby turns out that the determination of the relative position of the grasped object with respect to the gripper and the force exerted on the grasped object are of particular significance.

It is also known from [1] that what is referred to as an object and contact sensor is employed for determining the position and the force.

What is understood by an object sensor is a sensor that acquires the position of an object. With such a sensor, the position of an object is determined, a known object is recognized and identified and an unknown object is measured.

A typical implementation of this sensor is an ultrasound distance sensor, a laser distance sensor or a camera viewing system.

What is understood by a contact sensor is a sensor that enables a statement about the contact of the gripper with an object. The quantities that can be measured at the contact surface between gripper and object can thereby be subdivided into qualitative and quantitative information. For example, spatial forces and moments as well as the attack point of the force can be qualitatively acquired. Further contact quantities such as gripping and holding forces can be determined from these quantities. The sensor employed for the acquisition of these quantities is also referred to a force sensor.

In contrast thereto, what is referred to as a tactile sensor frequently measures a purely qualitative quantity. An important qualitative information is comprised, for example, therein whether a gripper jaw of a two-jaw gripper as disclosed in [1] has contact with an object. This is often difficult to decide with exclusive employment of a force sensor given a lightweight object. The nature of the contact is another important qualitative information. A further aim is to identify the shape and surface quality of the grasped object with a tactile sensor. Further, the slipping of an object can be determined with a tactile sensor. Further, an object can be recognized, distinguished and a statement about the position and the attitude of the grasped object can be made with the tactile sensor.

Frequently employed embodiments of a contact sensor are a wire strain gauge, a piezoceramic or a semiconductor pressure sensor.

It is also known from [2] that the object sensor and the contact sensor exhibit various disadvantages. Thus, the laser distance sensor and the camera viewing system is [sic] expensive and makes [sic] high demands of an evaluation electronics. In contrast thereto, the ultrasound distance sensor in fact exhibits a low price and a great ruggedness. However, the precision of such a sensor, its susceptibility to disturbance with respect to a temperature fluctuation, an external signal or a multiple reflection and the low range of the sensor make the use thereof only conditionally possible.

Another disadvantage of the known sensors is comprised therein that a plurality of sensors are needed for the simultaneous measurement of a quantitative and qualitative state quantity. This in turn leads thereto that the structural size of such a combined sensor is larger compared to an individual sensor.

The invention is thus based on the problem of determining the relative position of two objects with respect to one another in a simple, flexible and cost-beneficial way as well as with the possibility of a miniaturization of the system.

The problem is solved by the arrangement according to patent claim 1, the set with a plurality of arrangements according to patent claim 16 as well as by the method according to patent claim 21.

The arrangement for determining a relative position of two objects with respect to one another comprises a radiation source that is configured such that it generates radiation having a characteristic radiation field. The arrangement further comprises a receiver that is configured for the reception of the radiation, and an evaluation unit coupled to the receiver with which the relative position of the objects with respect to one another can be determined from the signals received from the receiver, said signals being dependent on the reception location in the characteristic radiation field.

The following is to be understood as the characteristic radiation field of the radiation source:

The radiation source outputs radiation and thus generates a three-dimensional radiation field. The radiation has known radiation quantities at every point in the three-dimensional radiation field, whereby the respective point can be unambiguously determined from the known radiation quantities.

The set with a plurality of arrangements for determining a relative position of two objects with respect to one another comprises a plurality of arrangements, whereby each arrangement comprises a radiation source that is configured such that it generates radiation with a characteristic radiation field and comprises a receiver that os configured for the reception of the radiation. The set with a plurality of arrangements further comprises at least one evaluation unit coupled to the receivers with which the relative position of the objects with respect to one another from the signals received from the receiver, said signals being dependent on the reception location in the characteristic radiation field.

The following steps are implemented in the method for determining a relative position of two objects with respect to one another:

a) a radiation source generates radiation with a characteristic radiation field;

b) a receiver measures radiation quantities of the radiation;

c) the receiver transmits signals, which are dependent of the measured radiation quantities in the characteristic radiation field, to the evaluation unit;

d) the evaluation unit determines the relative position of the objects with respect to one another dependent on the signals received by the receiver.

A very simple method and a very simple arrangement for a position sensor are created by the invention. This position sensor makes it possible to simultaneously measure six degrees of motion freedom with only one sensor. The invention additionally permits the miniaturization of such an arrangement. Such a sensor can the be cost-beneficially produced and very flexibly utilized.

Preferred developments of the invention derive from the dependent claims.

The arrangement of radiation source and receiver can ensue in various ways. It has proven advantageous in view of a further simplification of the invention that either the first object carries the radiation source and the second object carries the receiver or the first object carries both the radiation source as well as the receiver. In this case, the second object is equipped with a reflector.

The characteristic radiation field is preferably an asymmetrical radiation field. Simplifications in the interpretation of the radiation quantities derive as a result thereof.

It is provided in a further development that the two objects are connected to one another by an elastic connection having a predetermined stiffness. A force acting between the objects and/or a moment acting between the objects can thus be additionally identified.

For cost reasons, it is advantageous to employ the following elastic connections:

a) at least one spring element;

b) silicone;

c) cellular material.

When the elastic connection exhibits electrical conductivity, then it is possible to also use the elastic connection as an electrical conductor.

In order to determine the force acting between the objects and/or the moment acting between the objects with such an arrangement, the evaluation unit coupled to the receiver is configured such in one embodiment that forces and/or moments can be determined from the signals received by the receiver dependent on the stiffness of the connection. The embodiment of such a force sensor works according to the following method:

a) the radiation source generates the characteristic radiation field in a first relative position of the objects with respect to one another;

b) the receiver measures the radiation quantities of the radiation in the first position;

c) the receiver transmits the signals, which are dependent on the measured radiation quantities in the characteristic radiation field, to the evaluation unit;

d) the evaluation unit determines the first relative position of the objects with respect to one another dependent on the signals received by the receiver;

e) a relative positional change of the two object with respect to one another is produced;

f) the radiation source generates the characteristic radiation field in a second relative position of the objects with respect to one another;

g) the receiver measures the radiation quantities of the radiation in the second position;

h) the receiver transmits the signals, which are dependent on the measured radiation quantities in the characteristic radiation field, to the evaluation unit;

i) the evaluation unit determines the second relative position of the objects with respect to one another dependent on the signals received by the receiver;

j) the force causing the positional change and/or the moment causing the positional change is calculated dependent on the stiffness of the connection of the two objects.

Such an embodiment makes it possible to implement a multi-dimensional force and/or moment measurement with only one sensor.

It has proven advantageous in view of the production costs to employ LED elements for the radiation source and/or phototransistors for the receiver.

The arrangement of the LED elements and of the phototransistors preferably ensues in two different forms. The calculating outlay for determining the relative position or, respectively, the force and/or the moment between the two objects is reduced as a result thereof. When the relative position of the two objects with respect to one another is defined in Cartesian coordinates, it is expedient to arrange the LED elements and the phototransistors equidistantly right-angled. This is particularly suited for the measurement of a relative displacement of the two objects with respect to one another along the translation directions. For the positional determination of the two objects with respect to one another in cylindrical coordinates, it is advantageous to arranged the LED elements circularly and the phototransistors cross-shaped.

It is also advantageous in one development that the radiation source generates electromagnetic radiation like visible light. The receiver measures the light intensity as physical radiation quantity. Simple and cost-beneficial, light-sensitive, standard photoreceptors can then be utilized.

It is provided in a further development that the force sensor is employed for determining the gripping force and/or the gripping moment of a gripper. It is advantageous in view of the precision of the measurement to respectively mount a plurality of force sensors next to one another on insides of a two-jaw gripper that are directed toward one another. Given this embodiment, the evaluation unit is correspondingly configured such that a) the position of a third object grasped with the gripper b) and the gripping force acting on the third object and/or the gripping moment acting on the third object can be determined.

Various exemplary embodiments of the invention are shown in FIGS. 1 through 6 and are explained in greater detail below.

Figure 5:
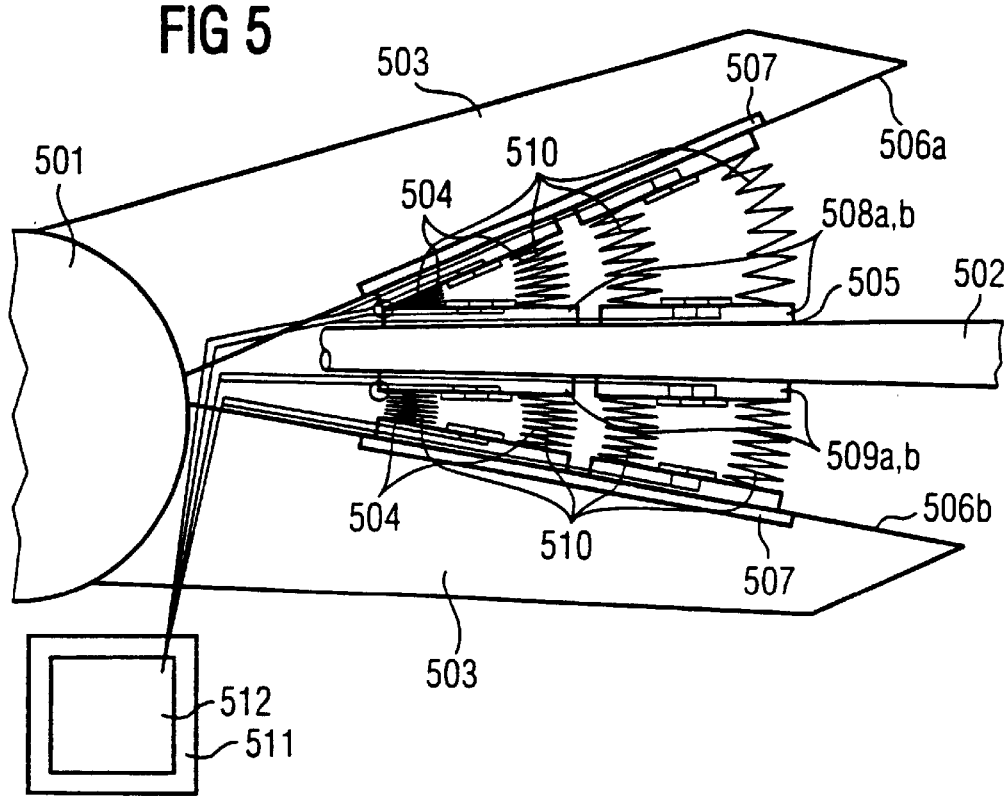
Figure 6:
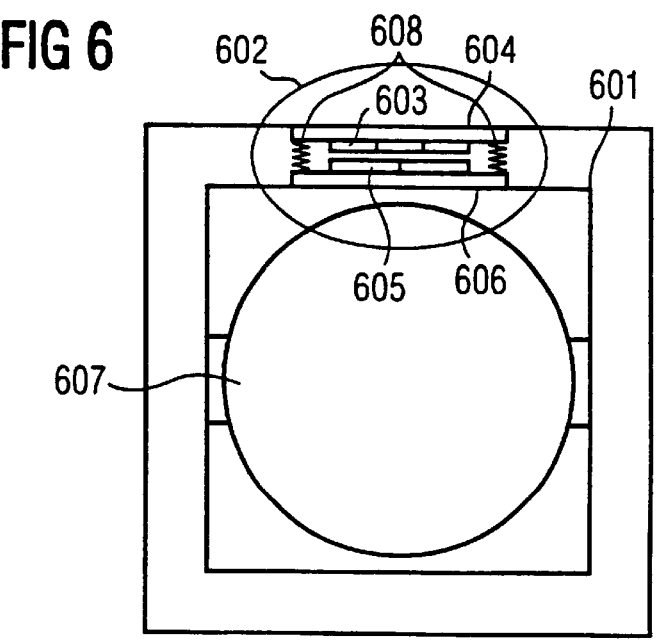
Figure 7:
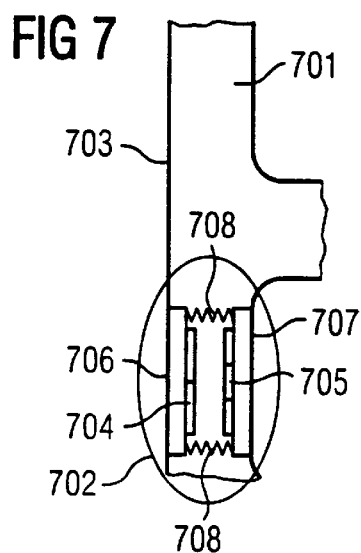
Figure 8:
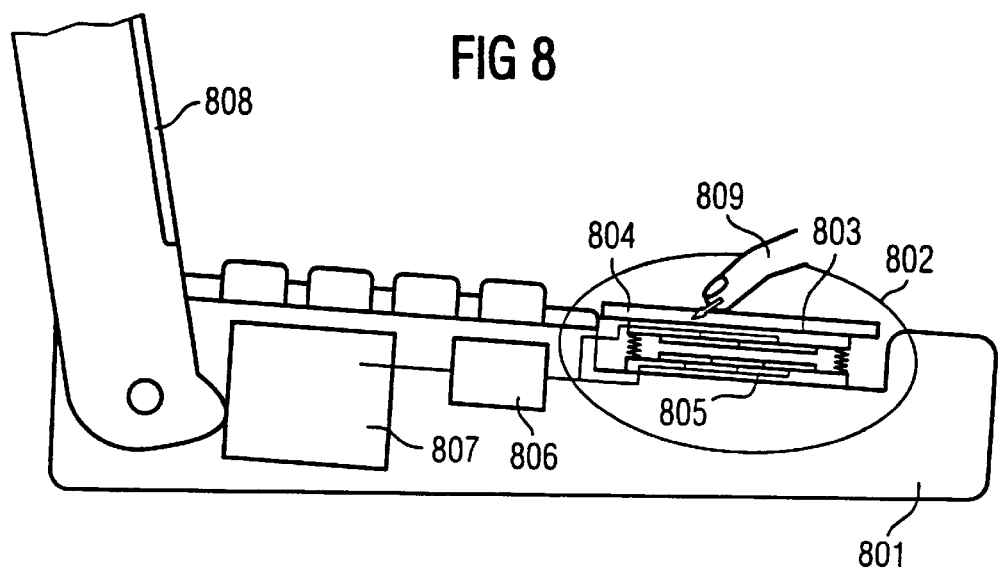

Shown are:

FIG. 1 structure of a position sensor for determining the relative position of two objects;

FIG. 2 function principle of the position sensor;

FIG. 3 illustration of the function principle of the position sensor based on the recognition a) of a relative displacement along the x-axis, b) of a relative displacement along the z-axis, c) of a rotation around the y-axis by the angle b;

FIG. 4 structure of a position-force sensor;

FIG. 5 determination of the gripping force of a two-jaw gripper;

FIG. 6 recognition of an unbalanced load of a washing machine;

FIG. 7 employment of a force-position sensor for overload recognition;

FIG. 8 employment of a force-position sensor as operating element of a notebook;

FIG. 9 employment of a force-position sensor as measuring system for loading transport vehicles, stackers or lifts;

FIG. 10 employment of a force-position sensor as measuring system for ergonomics.

1. STRUCTURE AND FUNCTION PRINCIPLE OF A POSITION SENSOR

FIG. 1 shows a two-dimensional illustration of the structure of a sensor for determining the relative position of two objects with respect to one another. The positional sensor comprises two parts:
- a receiver 101 is equipped with four light-sensitive photo transistors 102. These are arranged at a right angle relative to one another and equidistantly on a motherboard 103.
- a transmitter 104 is equipped with 9 LED elements 105. These are likewise arranged at a right angle relative to one another and equidistantly on a motherboard 106.

The plurality of photo transistors and of LED elements is selected as a comprise between structural size, costs and precision demands. The right-angled and equidistant arrangement of the elements is meaningful since this position sensor aims particularly at measurements of the translation components (relative displacements along the x-axis, y-axis and z-axis).

The transmitter and the receiver are directed 107 to one another for the reception. The motherboards are connected to the first and second object 110 or, respectively, 111 on the backside 108 or, respectively, 109 with respect to the LED elements and photo transistors.

The transmitter and the receiver are coupled to an evaluation unit 112 that is realized by a freely programmable processor 113.

Figure 2A:
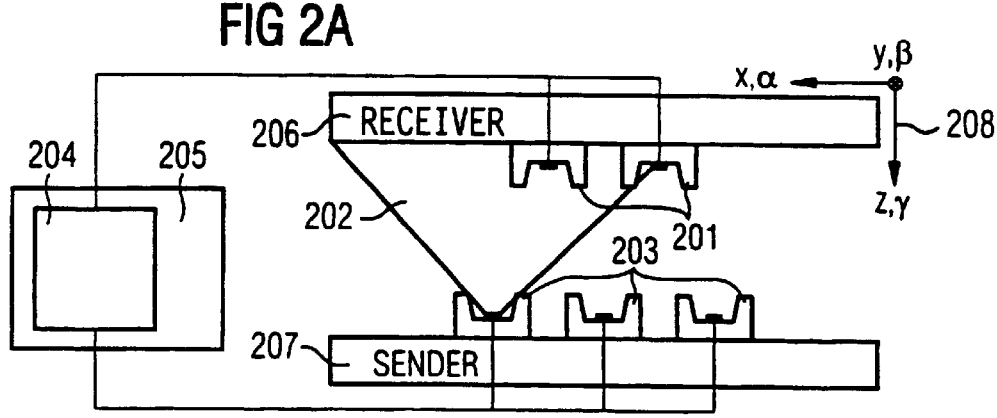
Figure 2B:
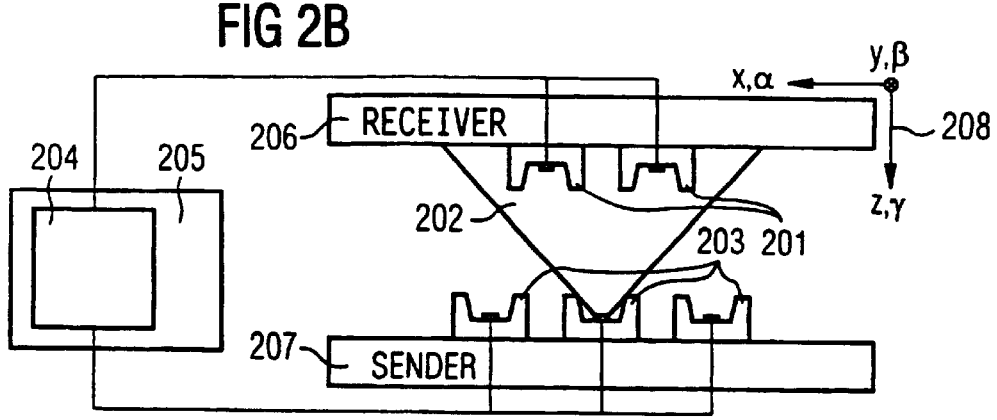
Figure 2C:
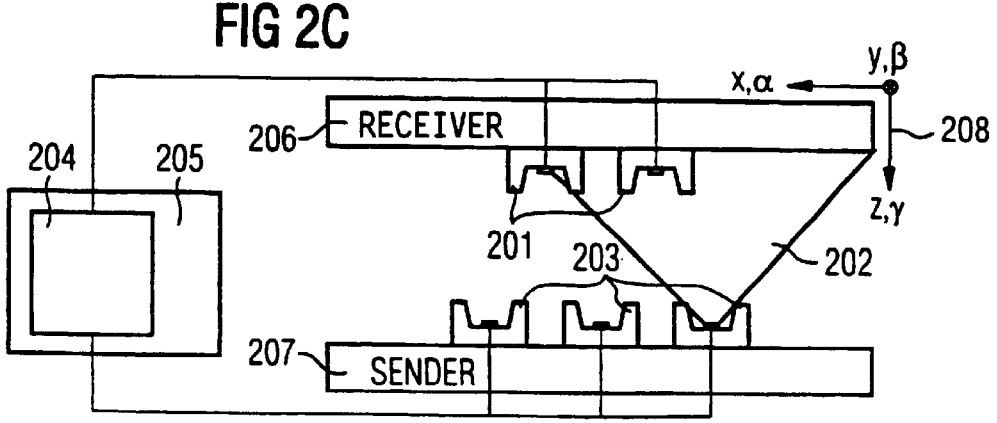

FIGS. 2 through 4 show the function principle of the position sensor. The transmitter beams light having a known radiation characteristic 202 from various LED elements 201 offset in time (see FIGS. 2a, 2b and 2c). In each of the radiation situations shown in FIGS. 2 through 4, the light intensity is measured at the photo transistors 203. The light intensity is transmitted to the evaluation unit 204, which is realized by a freely programmable processor 205. The freely programmable processor 205 determines the relative position of the receiver 206 and transmitter 207 with respect to one another therefrom. For the relative position calculation, the intensity reduction connection with an increasing distance, the directional characteristic of the transmitter and receiver elements 201, 203 as well as the multiple reflection of the light between 207 and receiver 206 are among the things taken into consideration.

The sensors operated with a sampling rate of 100 Hz. As a result, the x, y and z coordinates of the transmitter relative to the receiver 206 as well as the rotations of the transmitter 207 by the angles a, b and g relative to the receiver 206 are output. The coordinates and rotational angles refer to a coordinate system 208 disposed in the receiver.

Figure 3A:
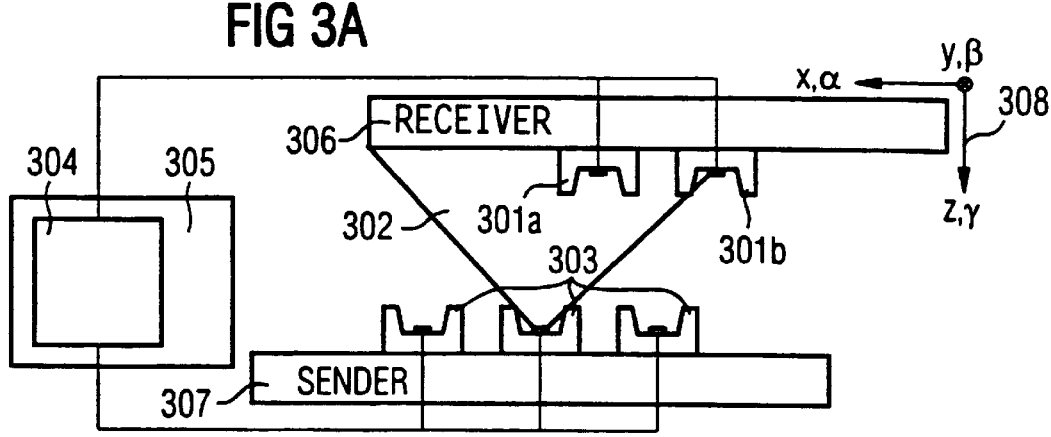

FIG. 3a) shows the principle of the position recognition of a relative displacement of the transmitter 307 and of the receiver 306 with respect to one another along the x-axis. This displacement leads thereto that a lower light intensity 302 is measured at the photo transistor 301a of the receiver 306 than in the comparable arrangement in FIG. 2b). The processor 305 determines the direction and the size of the relative displacement from the modification of the light intensities.

Figure 3B:
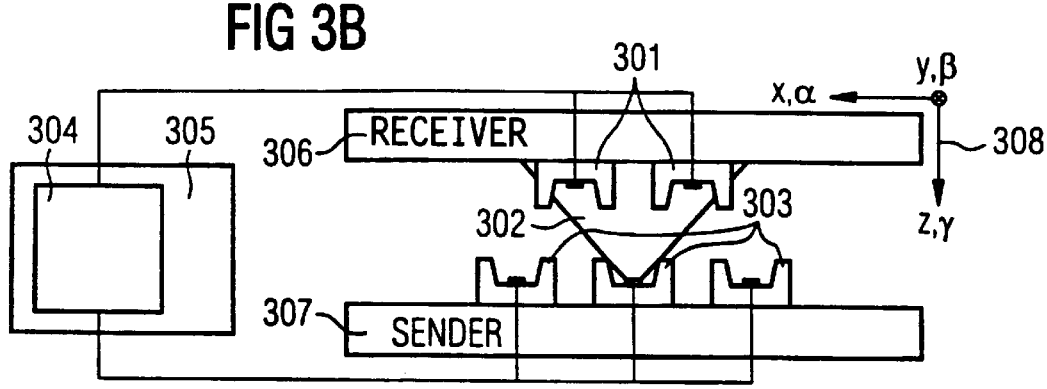

FIG. 3b) illustrates the position recognition of a relative displacement of the transmitter 307 with respect to the receiver 306 along the z-axis. Compared to the radiation situation shown in FIG. 2b), light having a higher intensity impinges the photo transistors 301, since the distance between transmitter 307 and receiver 306 was reduced. Multiple reflections are taken into consideration to a greater extent. The processor 305 determines the direction and size of the relative displacement from the modification of the light intensities.

Figure 3C:
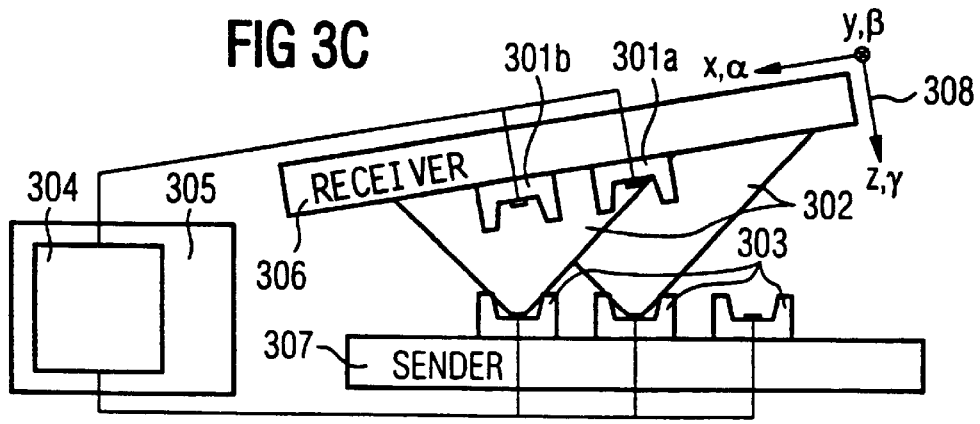

FIG. 3c) shows the principle of a relative rotation of the transmitter 307 with respect to the receiver 306 around the y-axis by the rotational angle b. The photo transistor referenced 301a in FIG. 3c) has a greater distance from the transmitter 307 than the photo transistor 301b and thus receives lower light intensities than the photo transistor 301b. The distance of the transmitter 307 from the photo transistor 301b has been reduced and, thus, the photo transistor 301b receives radiation with greater light intensity. The processors 305 determines the rotational angle b from the comparison of the measured light intensities.

2. STRUCTURE OF A POSITION-FORCE SENSOR OF A TWO-JAW GRIPPER

A second exemplary embodiment is shown in FIGS. 4 and 5 and is explained in greater detail below.

FIG. 4 shows an implementation of the invention as position-force sensor 401 or, respectively, 504 in order to control a gripper movement and the strength of an access of a two-jaw gripper 501 to a further object 502. The position-force sensor 401 or, respectively, 504 thereby determines the relative position of the object 502 between the two jaws 503 of the gripper (FIG. 5). In addition, the position-force sensor 401 or, respectively, 504 supplies all forces and moments occurring at a gripping surface 505 between sensor 401 or, respectively, 504 and object 502. The gripping position and the access [sic] strength during the gripping process can thus be constantly monitored by the position-force sensor 401 or, respectively, 504 and can be corrected by the position-force sensor 401 or, respectively, 504.

For the embodiment of the senor as position-force sensor 401, respectively two position sensors 402 according to exemplary embodiment 1 are arranged side-by-side on a base plate 403 (FIG. 4). To that end, the two receiver motherboards 404a, b that carry the photo transistors 405 arranged equidistantly right-angled are integrated into the base plate 403. The size of the base plate 403 amounts to 70 mm×30 mm. The size of the two transmitter motherboards 406a, b that are respectively equipped with nine LED elements 407 arranged equidistantly right-angled amounts to 30 mm×30 mm. The two transmitter motherboards 406a, b are respectively connected to the base plate 403 via four coil springs 408 having a known stiffness. The distance between transmitter 409 and receiver 410 amounts to 30 mm in the unloaded arrangement.

The transmitter 409 and the receiver 410 are coupled to an evaluation unit 411 that is realized with a programmable processor 412. The position-force sensor 401 is operated with a sampling rate of 100 Hz.

FIG. 5 shows that respectively one of these arrangements is attached to the inside 506a, b of the jaw of a gripper jaw 503. To that end, the base plate 507 is secured to the gripper jaw 503. The grasped object 502 lies between the transmitter motherboards 508a, b or, respectively, 509a, b.

When the two-jaw gripper 501 grasps the object 502, then the coil springs contained in the position-force sensor 504 effect that the gripper jaws 503 lie positively against the object 502 to be grasped. A secure grip with large-area friction contact between the object 502 to be grasped and the gripper jaws 503 is thus possible. Due to the deformation of the spring elements 510, positional imprecisions of the grasped object 502 occur. Since, however, the relative position of the object 502 between the jaws 503 of the jaw gripper 501 is determined and the strength and the direction of the deformation is measured, the evaluation unit 511 can compensate the positional imprecision in the gripping motion.

3. FURTHER EXEMPLARY EMBODIMENTS OF THE POSITION-FORCE SENSOR

Further areas of employment of the invention as position-force sensor are presented below.

Recognizing an Unbalanced Load of a Washing Machine

FIG. 6 shows an embodiment of the invention as position-force sensor 602 wherein the sensor is utilized for recognizing an unbalanced load in a washing machine 601. To that end, the sensor 603 is attached to the inside of the housing 604 of the washing machine 601, and the receiver 605 is attached to the outside of the housing 606 of the washing machine drum 607. The length of the coil springs 608 is correspondingly adapted. Both the size and the direction as well as the intensity of the movement of the washing machine drum 607 are thus measured. Conclusions about the occurrence of a drum imbalance and the nature and size of the imbalance are drawn therefrom. As a result of early recognition and initiation of counter-measures, where phenomena and damage resulting from the unbalance are eliminated early.

Overload Recognition

In the embodiment of the invention as position-force sensor 702, the sensor is also utilized for overload recognition during operation of a machine 701 such as, for example, a household device. This embodiment of the invention is shown in FIG. 7. What is thereby exploited is that the housing 703 of the machine 701 measurably deforms given an excessive load. Transmitter 704 and receiver 705 of the position-force sensor 702 are secured to opposite housing part 706 or, respectively, 707. The length of the coil springs 708 is correspondingly adapted.

Given too high a load, the housing 703 of the machine 701 deforms. The position-force sensor 702 determines the direction, the size and the force causing the deformation and/or the moment causing the deformation. The load quantities are constantly determined during operation of the machine 701. Dependent on the result, the machine 701 activates a counter-measure early (for example, immediate shut-off, brief-duration reverse running) and can thus prevent damage early.

Machine Control by Input of Three-Dimensional Control Commands

A further embodiment of the invention as position-force sensor serves the purpose of improving the operation of machines or devices. In practice, many machines and devices are controlled via manual operation keyboards. The allocation of actuation direction of the operating element to a specific implementation direction of the device or of the machine is often difficult. One cause of these compatibility problems is comprised therein that not all degrees of freedom possible with the machine can be controlled with a two-dimensional or one-dimensional operating element. A plurality of operating elements are needed for the control or the limitation of the functionality of the machine. As a result of the possibility of the position-force sensor of measuring direction and size of three-dimensional forces and moments, the input of three-dimensional motion commands is possible.

As shown in FIG. 8, such a force-position sensor can be employed as improved input means for a computer.

Touchpad for a Notebook

Due to lack of space, a mouse is often not employed at a notebook 801. Since the track ball has also not really prevailed as operating tool, two other solutions are currently utilized. The one expedient is a touchpad. The other operating tool is fashioned similar to an analog miniature joy stick.

The position-force sensor 802 known from the above exemplary embodiment is utilized as a combination of these two solutions. As a result of the possibility of the sensor 802 of measuring three-dimensional forces and moments, a three-dimensional motion command is possible. To that end, a traditional touchpad 804 is attached to the backside of the transmitter motherboard 803. The evaluation unit 806 coupled to the transmitter 802 and to the receiver 805 of the position-force sensor 802 is coupled to the processor 807 of the notebook 801. In addition to the normal function of the touchpad 804, the force-position sensor 802 measures the direction and the size of the finger pressure 809 on the touchpad 804. As a further operating quantity, the position-force sensor 802 measures the tilting and/or the torsion moment. All of these operating quantities are employed as control quantities for the mouse pointer of the picture screen 808.

In this embodiment of the invention, the position-force sensor is also advantageous for CAD software applications at a stationary computer.

Measuring System for Loading Transport Vehicles, Stackers or Lifts

Another embodiment of the invention as position-force sensor is shown in FIG. 9.

An automatically or manually controlled transport vehicle 901 is partially loaded with a great quantity of transport goods 902. In order to enhance the safety of such a vehicle, the loading platform 903 is resiliently 904 suspended. Mechanically, the spring-bearing 940 is designed such that a slight remaining spring path remains at full load and an overload is precluded. A plurality of position-force sensors 905 are installed at the corners of the loading platform 903. The total load of the loading 902 and the load distribution on the loading surface 903 can thus be constantly measured and can be monitored and controlled given automatic loading. During the travel of the transport vehicle 901, the current curve velocity is monitored by the position-force sensors 905 via the measurement of the transverse forces. Particularly given an automatic transport system, the allowable transport velocity is thus adapted to the current load quantity 902.

Measuring System For Ergonomic Purposes

In further embodiments, the invention as position-force sensor is employed as measuring tool in the field of ergonomics. A plurality of position-force sensors 1001 corresponding to the exemplary embodiment 4 are attached to a seating surface 1002 and a back rest surface 1003, on a floor 1004 or in a handle 1005. How a person 1006 exerts pressures and forces onto the seating surface 1002 and backrest surface 1003, onto the floor 1004 or onto the handle 1005 is thus investigated. The evaluation can be medically interpreted and used for improved ergonomic design of the product. In contrast to traditional methods, that can only measure the one-dimensional pressure distribution at the surface, the position-force sensor 1001 enables a more exact discovery of the size and direction of a multi-dimensional contact force.

A few modifications of the exemplary embodiments described above are recited below:

For measuring the relative position of two objects with respect to one another in cylindrical coordinates, the LED elements are circularly applied on the transmitter motherboard. The photo transistors are arranged cross-shaped on the receiver motherboard.

It is provided in one version of the invention to attach a planar, tactile sensor element to the contact surface 505 between the position-force sensor 504 and the object 502. This element measures the pressure distribution over the contact surface 505.

Further, it is provided in another version of the invention to omit the coil springs 708 of the position-force sensor 702 in the overload recognition during operation of a machine 701. The position-force sensor 702 works as position sensor. When a measured, relative positional change given a deformation of the housing 703 of the machines 701 exceeds a predetermined relative positional change, the 701 has recourse to a counter-measure early (for example, immediate disconnect, brief-duration running in reverse), and can thus prevent damage early.

The following publications are cited in this document:

[1] B. Magnussen, Infrastruktur für Steuerungs- und Regelungssysteme von robotischen Miniatur- und Mikrogreifern, Fortschrittberichte VDI, Reihe 8, No. 567, p. 68.78, VDI Verlag GmbH, Düsseldorf, 1996

[2] R. Bauer, Integriertes hierarchisches Navigationssystem für autonome mobile Roboter, p. 17–23, p. 35–41, Dissertation Linz University, 1997

What is claimed is:

1. An arrangement for determining a relative position of two objects, which are a first object and a second object, with respect to one another, comprising:

a radiation source which generates radiation with a characteristic radiation field, the generated radiation having known radiation quantities at each point in said characteristic radiation field given said characteristic radiation field, wherein a respective point can be unambiguously determined from said known radiation quantities;

a receiver which receives the generated radiation at a reception location which is dependent upon a relative position of the first and second object and generates signals; and an evaluation unit coupled to said receiver with which the relative position of the first and second objects with respect to one another can be determined from the signals received from said receiver, the signals being dependent on the reception location in said characteristic radiation field.

2. The arrangement according to claim 1, wherein said first object carries said radiation source and said second object carries said receiver.

3. The arrangement according to claim 1, further comprising:

an elastic connection having a predetermined stiffness that connects said first object to said second object.

4. The arrangement according to claim 3, wherein said elastic connection comprises an element selected from the group consisting of:

a) at least one spring element;
   b) silicone; and
   c) cellular material.

5. The arrangement according to claim 1, wherein said evaluation unit coupled to said receiver, determines a force acting between said two objects based on the signals received from said receiver dependent on a stiffness of a connection between said two objects.

6. The arrangement according to claim 1, wherein said evaluation unit coupled to said receiver, determines a moment acting between said objects based on the signals received from said receiver dependent on a stiffness of a connection between said two objects.

7. The arrangement according to claim 1, wherein said radiation source is at least one LED element.

8. The arrangement according to claim 7 wherein said radiation source is a plurality of LED elements.

9. The arrangement according to claim 8 wherein:

a) said plurality of LED elements are equidistantly arranged; and
   b) said receiver comprises equidistantly arranged photo transistors.

10. The arrangement according to claim 9 wherein a) at least three of said plurality of LED elements are arranged at a right angle; and
    b) said receiver comprises at least three photo transistors arranged at a right angle.

11. The arrangement according to claim 8 wherein:

a) said plurality of LED elements are circularly arranged; and
    b) said receiver comprises a plurality of photo transistors arranged cross-shaped.

12. The arrangement according to claim 1, wherein said receiver comprises a plurality of photo transistors.

13. The arrangement according to claim 12, wherein:

a) said plurality of LED elements are equidistantly arranged; and
    b) said receiver comprises equidistantly arranged photo transistors.

14. The arrangement according to claim 13, wherein a) at least three of said plurality of LED elements are arranged at a right angle; and
    b) said receiver comprises at least three photo transistors arranged at a right angle.

15. The arrangement according to claim 1, wherein said receiver measures light intensity.

16. A set comprising:

a plurality of arrangements for determining a relative position of two objects with respect to one another, wherein each said arrangement comprises:

a radiation source which generates radiation with a characteristic radiation field, the generated radiation having known radiation quantities at each point in said characteristic radiation field given said characteristic radiation field, wherein a respective point can be unambiguously determined from the known radiation quantities; and a receiver which receives the radiation at a reception location which is dependent upon the relative position of the two objects with respect to one another, said set further comprising:

at least one evaluation unit coupled to said receivers with which the relative position of the two objects with respect to one another can be determined from signals respectively received from one of said receivers, said signals being respectively dependent on the reception location in the characteristic radiation field.

17. The set according to claim 16, wherein each arrangement further comprises:

an elastic connection connecting said two objects having a predetermined stiffness;

said evaluation unit determining a force acting between said two objects based on the signals received from said receiver depending on a stiffness of said connections.

18. The set according to claim 17, further comprising:
a two-jaw gripper comprising two jaws;
wherein:
a plurality of arrangements are respectively mounted side-by-side on insides of said jaws directed toward one another; and
said evaluation unit identifying:
a) a position of a third object grasped with said gripper, and
b) a gripping force acting on said third object.

19. The set according to claim 16, wherein each arrangement further comprises:
an elastic connection connecting said two objects having a predetermined stiffness;
said evaluation unit determining a moment acting between said two objects based on the signals received from said receivers depending on a stiffness of said connections.

20. The set according to claim 19 further comprising:
a two-jaw gripper comprising two jaws;
wherein:
a plurality of arrangements are respectively mounted side-by-side at insides of said jaws directed toward one another; and
said evaluation unit identifying:
a) a position of a third object grasped with said gripper, and
b) a gripping moment acting on said third object.

21. A method for determining a relative position of two objects with respect to one another, comprising:
generating radiation with a characteristic radiation field, the radiation having known radiation quantities at each point in the characteristic radiation field given the characteristic radiation field;
unambiguously determining a respective point from the known radiation quantities;
measuring radiation quantities of radiation to be measured based on a relative position of the two objects with respect to one another;
generating signals that are dependent on the measured radiation quantities in the characteristic radiation field; and
determining the relative position of the objects with respect to one another depending on the generated signals.

22. The method according to claim 21, further comprising:
connecting the two objects with an elastic connection having a predetermined stiffness; and
determining a force acting between the objects from a relative positional change of the two objects with respect to one another depending on a connection stiffness.

23. The method according to claim 22, further comprising:
generating the characteristic radiation field in a first relative position of the objects with respect to one another;
measuring radiation quantities of the radiation in the first position;
generating first signals that are dependent on the measured radiation quantities in the characteristic radiation field;
determining the first relative position of the objects with respect to one another depending on the first signals;
producing a relative positional change of the two objects with respect to one another;
generating the characteristic radiation field in a second relative position of the objects with respect to one another;
measuring radiation quantities of the radiation in the second position;
generating second signals that are dependent on the measured radiation quantities in the characteristic radiation field;
determining the second relative position of the objects with respect to one another depending on the second signals received from the receiver; and
calculating a force causing positional change depending on a stiffness of connection of the two objects.

24. The method according to claim 22, further comprising:
generating characteristic radiation field in a first relative position of the objects with respect to one another;
measuring radiation quantities of the radiation in the first position;
generating first signals that are dependent on the measured radiation quantities in the characteristic radiation field;
determining the first relative position of the objects with respect to one another depending on the first signals the two objects with respect to one another;
generating the characteristic radiation field in a second relative position of the objects with respect to one another;
measuring radiation quantities of the radiation in the second position;
generating second signals that are dependent on the measured radiation quantities in the characteristic radiation field;
determining the second relative position of the objects with respect to one another depending on the second signals; and
calculating a moment causing positional change depending on a stiffness of the connection of the two objects.

25. The method according to claim 21, further comprising:
connecting the two objects with an elastic connection having a predetermined stiffness; and
determining a moment acting between the objects from a relative positional change of the two objects with respect to one another depending on a connection stiffness.

26. The method according to claim 25 further comprising:
generating characteristic radiation field in a first relative position of the objects with respect to one another;
measuring radiation quantities of the radiation in the first position;
generating first signals that are dependent on said the measured radiation quantities in the characteristic radiation field;
determining the first relative position of the objects with respect to one another depending on the first signals;
producing a relative positional change of the two objects with respect to one another;
generating the characteristic radiation field in a second relative position of the objects with respect to one another;

measuring radiation quantities of the radiation in said second position;

generating second signals that are dependent on the measured radiation quantities in the characteristic radiation field;

determining the second relative position of the objects with respect to one another depending on the second signals; and calculating a force causing positional change depending on a stiffness of the connection of the two objects.

27. The method according to claim 25 further comprising:

generating the characteristic radiation field in a first relative position of the objects with respect to one another;

measuring radiation quantities of the radiation in the first position;

generating first signals that are dependent on the measured radiation quantities in the characteristic radiation field;

determining the first relative position of the objects with respect to one another depending on the first signals;

producing a relative positional change of the two objects with respect to one another;

generating the characteristic radiation field in a second relative position of the objects with respect to one another;

measuring radiation quantities of the radiation in the second position;

generating second signals that are dependent on the measured radiation quantities in the characteristic radiation field;

determining the second relative position of the objects with respect to one another depending on the second signals; and calculating a moment causing positional change depending on a stiffness of the connection of the two objects.

28. Apparatus comprising:

a radiation source producing a characteristic radiation field having known radiation quantities at each point within the characteristic radiation field;

a receiver receiving the radiation at a reception location which is dependent upon a relative position of first and second objects, and generating an output signal;

an evaluation unit coupled to said receiver, determining the relative position of the first and second objects based on the output signal.

29. An apparatus as set forth in claim 28, wherein said apparatus is included in a touch pad of a keyboard.

* * * * *